J. L. BURGOYNE.
MACHINE FOR WORKING AND SHAPING DOUGH OR OTHER PLASTIC SUBSTANCES.
APPLICATION FILED DEC. 8, 1914.
1,258,866.
Patented Mar. 12, 1918.
3 SHEETS—SHEET 1.
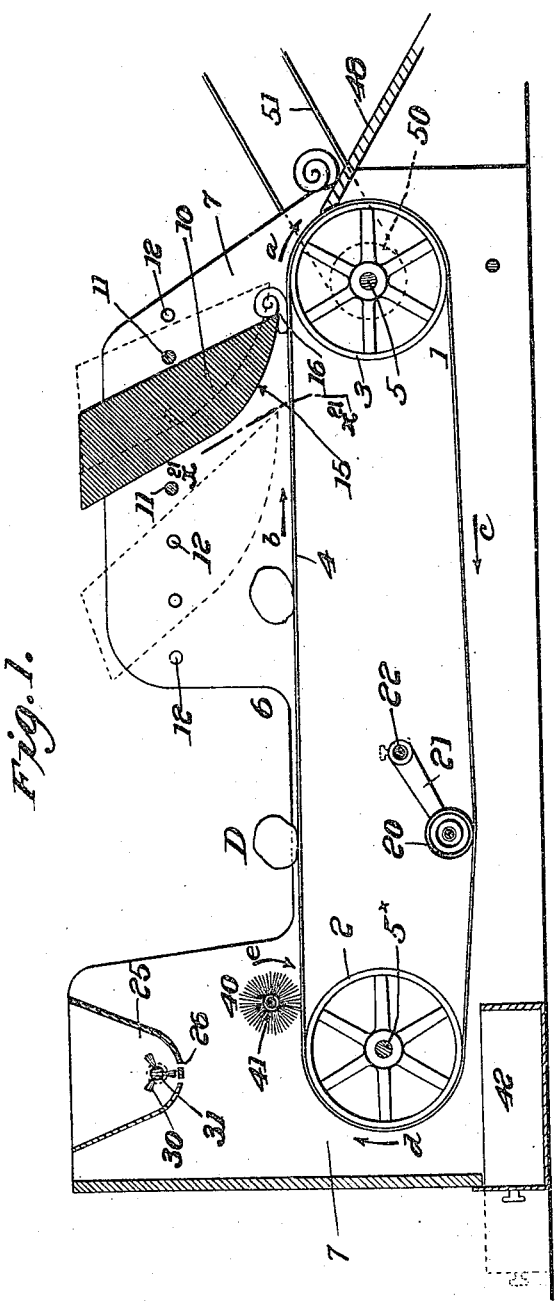
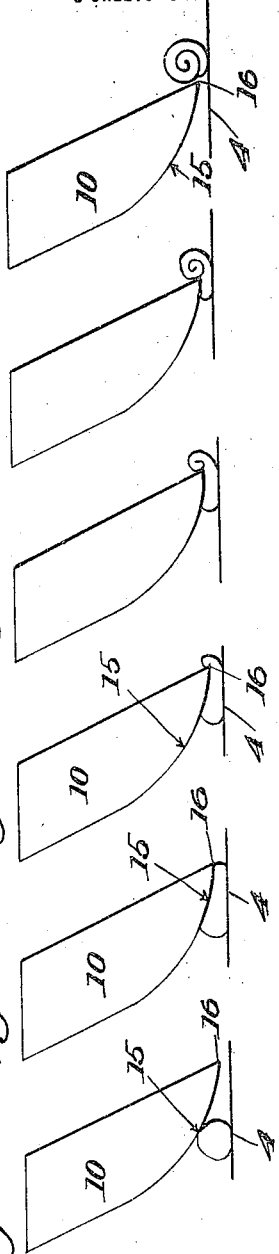
WITNESSES:
Alan Franklin.
P. S. Pidwell
INVENTOR.
John Louis Burgoyne
BY John H. Miller
ATTORNEY.

J. L. BURGOYNE.
MACHINE FOR WORKING AND SHAPING DOUGH OR OTHER PLASTIC SUBSTANCES.
APPLICATION FILED DEC. 8, 1914.
1,258,866. Patented Mar. 12, 1918.
3 SHEETS—SHEET 2.
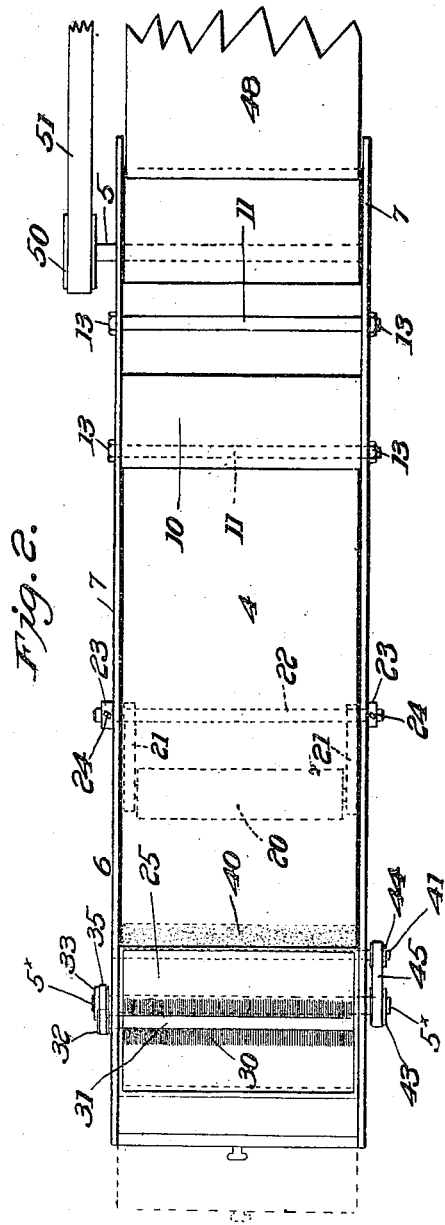
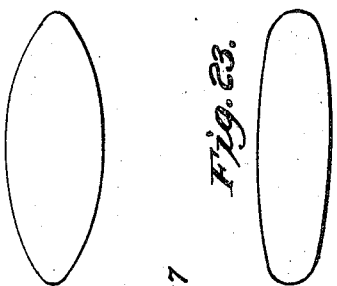
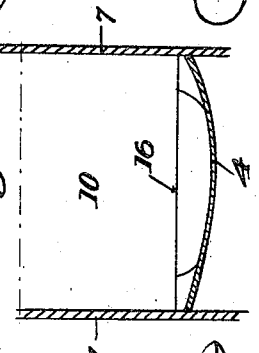
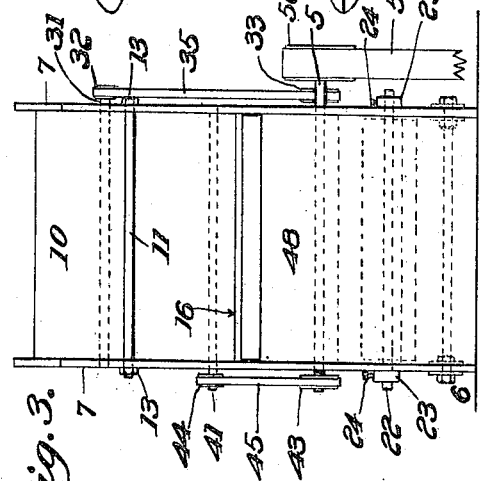
WITNESSES:
Alan Franklin
P. S. Pidwell
INVENTOR.
John Louis Burgoyne
BY John H. Miller
ATTORNEY.

J. L. BURGOYNE.
MACHINE FOR WORKING AND SHAPING DOUGH OR OTHER PLASTIC SUBSTANCES.
APPLICATION FILED DEC. 8, 1914.

1,258,866.

Patented Mar. 12, 1918.
3 SHEETS—SHEET 3.

WITNESSES:
Alan Franklin.
P. S. Pidwell,

INVENTOR.
John Louis Burgoyne
BY John S. Miller
ATTORNEY.

UNITED STATES PATENT OFFICE.

JOHN LOUIS BURGOYNE, OF SAN FRANCISCO, CALIFORNIA.

MACHINE FOR WORKING AND SHAPING DOUGH OR OTHER PLASTIC SUBSTANCES.

1,258,866.

Specification of Letters Patent.

Patented Mar. 12, 1918.

Application filed December 8, 1914. Serial No. 876,076.

*To all whom it may concern:*

Be it known that I, JOHN LOUIS BURGOYNE, a citizen of the United States, and a resident of the city and county of San Francisco, State of California, have made a new and useful invention—to wit, Machines for Working and Shaping Dough or other Plastic Substances; and I do hereby declare the following to be a full, clear, concise, and exact description thereof.

This invention is an improved machine and process for working and shaping dough or other plastic substances, and is particularly adapted to work and shape dough so that it may be baked into loaves of bread.

In this specification and the annexed drawings, I disclose the invention in the form which I consider the best, but it is to be understood that I do not limit myself to such form because the invention may be embodied in other forms, and it is to be understood that in and by the claims following the description herein, I intend to cover the invention in whatever form it may be embodied.

Referring to the drawings accompanying this specification and annexed hereto,

Figure 1 is a longitudinal section of a machine embodying my invention.

Fig. 2 is a plan view of the machine.

Fig. 3 is a front elevation of the machine.

Figure 4:
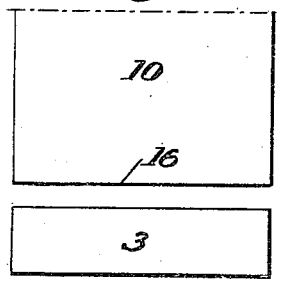
Fig. 4 is a diagrammatic view of the preferred form of the dough conveyer pulley and the tool which co-acts therewith to work and shape the dough for loaves of bread.

Figs. 5 to 12 inclusive are views similar to Fig. 4 of modifications of the pulley and tool.

Figs. 13 to 18 are views illustrating successive stages of the operation of working and shaping the dough for loaves of bread.

Fig. 19 is a plan view of the dough after it has been worked and shaped by the machine into the form of a loaf commonly known as the ideal French loaf.

Fig. 20 is a bottom view of said loaf showing the key or seam thereof.

Fig. 21 is a cross sectional view taken on line $x^{21}$—$x^{21}$ of Fig. 1, showing the conveyer belt and the blade adjusted directly over the belt, and the dough passing therebetween and bellying the belt.

Figure 6:
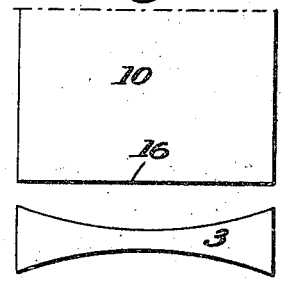

Fig. 22 is a view of a roll formed by passing between the blade and conveyer belt as shown in Fig. 21 or by passing between the blade and the pulley as shown in Fig. 6.

Figure 5:
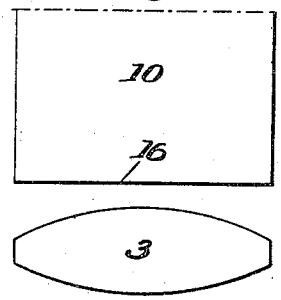
Figure 7:
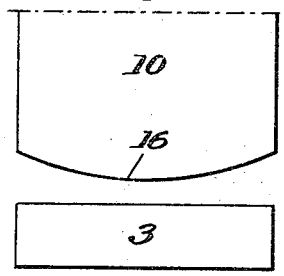
Figure 8:
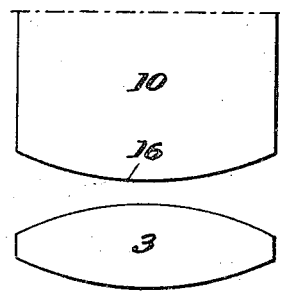
Figure 9:
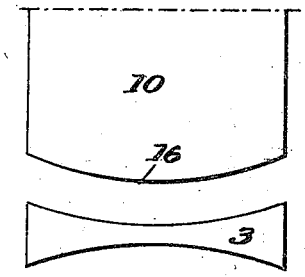
Figure 10:
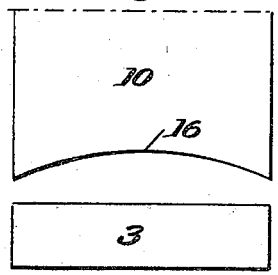
Figure 11:
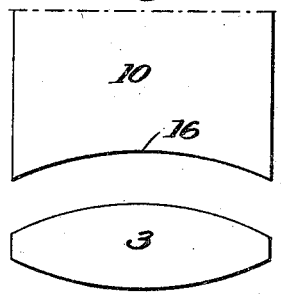
Figure 12:
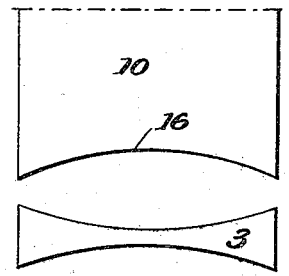

Fig. 23 is a view of an American loaf formed by passing between the blade and pulley as shown in Figs. 5 and 7.

Fig. 24 is a cross-sectional view of the roll with the layers thereof integrated.

The invention contemplates a pair of pressure surfaces, a blade edge and means for conveying the dough between said surfaces, to work the dough so as to knead it and force gas out of it, and for conveying the dough between one of said surfaces and said blade edge to roll the dough into the form of a loaf.

As shown in the drawings, one of said pressure surfaces and said conveying means are in the form of an endless belt conveyer 1 which comprises a pair of pulleys 2 and 3 and an endless belt 4 which travels over said pulleys. Said pulleys are respectively mounted upon shafts $5^\times$ and 5 which are journaled in a frame 6 in the side walls 7 thereof. A shaping tool 10 is located between the walls 7 above the conveyer. In the preferred form this tool is of the same width as the belt 4, has a flat front face terminating in the lower edge 16 and curves from this lower front edge 16 upward and backward so as to produce the convex surface 15. Other forms, however, may be employed within the purview of the invention. Bolts 11 extend through holes 12 in walls 7 and nuts 13 screw on the ends of the bolts against said walls and draw the walls inwardly against the side edges of the tool into frictional engagement therewith whereby said tool is held rigidly in its proper position with relation to the conveyer 1. A series of holes 12 are provided in the side walls 7 so that the tool 10 may be adjusted to different positions between said walls and the bolts 11 placed in holes which are near the tool in order that said bolts and nuts 13 may draw the walls inwardly against the tool with the maximum force. The tool 10 may be adjusted to various horizontal and vertical positions and to various angles with relation to the conveyer belt and held in such positions by the side walls 7 when drawn inwardly against the tool by the bolts 11 and the nuts 13. At the lower portion of the tool 10 is formed the other pressure surface 15, which surface is preferably of convex shape and leads from the rear of the tool forwardly to an edge 16 at the lowermost extremity of the front face of the tool. The surface 15 and the belt 4 converge forwardly toward each other, so as to work the dough as it passes therebetween and so that the dough will be rolled at the edge 16 as will be hereinafter more fully described.

An idler 20 is journaled in arms 21 fixed on shaft 22 which shaft is mounted in bearing 23 in the side walls 7. Said idler may be swung into engagement with the belt 4 to tighten the belt by turning the shaft 22. The idler may be secured in different positions with relation to the belt by a set screw 24, which screws into bearing 23 and engages the shaft 22 and holds the shaft against turning. Located above the rear end of the conveyer 1 is a flour sieve 25, the lower wall 26 of which is perforated so that the flour in the sieve may drop through said wall onto the conveyer. A rotary brush 30, fixed on a shaft 31 journaled in the side walls of the sieve, is located within the sieve and is adapted to sweep the perforated wall 26 and force the flour therethrough onto the conveyer. The brush 30 may be rotated from the shaft 5× through the medium of pulleys 32 and 33 on shafts 31 and 5× respectively, and belt 35, which travels around the said pulleys. A rotary brush 40, fixed on shaft 41 journaled in the side walls 7 in front of the place on the belt where the flour drops from the sieve 25, is adapted to sweep the excess flour backwardly off the belt 4 into a pan 42. The brush 40 may be rotated from the shaft 5× through the medium of pulleys 43 and 44 and belt 45 which travels over said pulleys.

An inclined apron 48 may be placed in front of the pulley 3 to convey the dough away from the machine after it is operated on by the machine.

Power may be applied to the shaft 5 to drive the conveyer 1 in any suitable manner, as for example, through the medium of a pulley 50 on shaft 5 and belt 51 which travels over said pulley, or the machine may be hand-driven by a suitable crank or otherwise.

The operation of my invention as herein disclosed is as follows: The pulley 3 is rotated in the direction of the arrow *a* by power through the medium of belt 51, pulley 50 and shaft 5, which causes the belt 4 to travel in the direction of the arrows *b* and *c* and the pulley 2 and shaft 5× to rotate in the direction of arrow *d*. As the shaft 5× is so rotated, the sieve brush 30 is rotated through the medium of pulley 33, belt 35, pulley 32 and shaft 31, which brush sweeps the flour in the sieve through the perforated wall 26 thereof onto the rear portion of the belt 4. As the sieve is operated and the flour sifted thereby upon the belt, the brush 40 is rotated in the direction or arrow *e*, from shaft 5× through the medium of pulley 43, belt 45, pulley 44 and shaft 41, and the excess flour is swept from the belt by the brush into the pan 42. The flour which is swept into said pan may be placed in the sieve and used over again.

A lump of dough D is placed upon the belt and is carried forward thereby so that it first engages the surface 15 of the tool 10 as indicated in Fig. 13 of the drawings. As soon as the dough engages the surface 15, as indicated in Fig. 13, the forward movement of the belt continues to carry the dough forward and causes the dough to be compressed between the surface 15 and the surface of the belt as shown in Figs. 14 to 17 inclusive, whereby the dough is worked so that it is kneaded and gas is pressed out of it. When the dough is carried by the belt under the edge 16 of the tool, said edge scrapes the upper side of the dough and draws it out into flat form having an adhesive surface on said upper side which surface adheres to the tool edge 16 and retards the movement of the upper side of the dough, while the flour on the belt forms a non-adhesive surface or skin on the lower side of the dough. As the belt pulls the dough forwardly under the tool edge 16 and said edge retards the upper side of the dough by its adherence to said side, the under non-adhesive or skin side of the dough is caused to roll upwardly against the front face of the tool and upon the adhesive upper surface of the dough, as illustrated in Figs. 15 to 18 inclusive, until the dough is completely rolled with its adhesive surface inside the roll, as shown in Fig. 18 of the drawings. The dough when completely rolled by the belt and tool edge is given a substantially straight key or seam extending longitudinally of the roll, as shown in Fig. 20 of the drawings. The rolling of the adhesive surface of the dough inside the dough roll causes the layers of the dough to adhere immediately together and to integrate so as to form a substantially homogeneous mass, as shown in Fig. 24 of the drawing, having the outside of the roll non-adhesive and of skin-like formation.

When it is desired to roll the dough into loaves having tapering ends commonly called French loaves, the conveyer pulley 3 may be cylindrical and the edge 16 of the tool 10 may be straight and parallel to the axis of the pulley, as shown in Fig. 4 of the drawings. In order to form the ideal French loaf, as shown in Fig. 19 of the drawings, the tool 10 is placed so that its edge 16 rests slightly in the rear of pulley 3, as shown in full lines in Fig. 1 of the drawings, in which position the belt 4 bellies slightly downwardly transversely as the dough passes between it and the edge 16, which gives the loaf the proper median diameter and taper toward its ends. By adjusting the tool 10 so that the edge 16 rests directly over the pulley, as shown in dotted lines in Fig. 1 of the drawings, a relatively long French loaf of small median diameter may be rolled. By adjusting the tool so that the edge 16 rests over the belt between the pulleys, as also indicated in dotted lines in Fig. 1 of the drawings, the belt will belly considerably downwardly transversely, as shown in Fig. 21 of the drawings, and cause the dough to be rolled into a relatively short French loaf of large median diameter as shown in Fig. 22 of the drawings.

When the tool is adjusted so that the edge 16 rests over the belt between the pulleys, the shape of the loaves may be varied by adjusting the tension of the conveyer belt. By increasing the tension of the belt a relatively long loaf of small median diameter is produced. By diminishing the tension of the belt a relatively short loaf of large median diameter is produced.

The tool edge 16 may be made straight and the pulley 3 convexed axially as shown in Fig. 5 of the drawings, so as to roll a substantially cylindrical or American loaf as shown in Fig. 23 of the drawings.

The tool may be made with a straight edge 16 and the pulley concaved axially as shown in Fig. 6 of the drawings, so as to roll a French loaf similar to that shown in Fig. 22.

The tool may be made with an outwardly curved edge and the pulley made cylindrical as shown in Fig. 7 of the drawings so as to roll an American loaf similar to that shown in Fig. 23.

The tool edge and the pulley may be otherwise constructed and arranged as suggested, for example in Figs. 8 to 12 inclusive, to roll the dough as desired.

The tool may be adjusted to various positions with relation to the belt and pulley to meet various conditions arising in the art.

The side walls 7 may be adapted to engage the ends of the dough to determine the length of the loaf.

Loaves of various lengths and weights may be formed on a machine by varying the amount of dough put into the machine. The greater the amount of dough the longer the loaf, and vice versa.

I claim:

1. In a machine of the character disclosed, a shaping tool having a lower front blade edge and a rearward upwardly extending convex surface, a surface associated with said tool, means for forcing dough first between said convex surface and said latter surface and then between said blade edge and said latter surface.

2. In a machine of the character disclosed a surface, a blade, and means for forcing the dough between said surface and blade and curling up the dough just as it emerges from said blade.

3. In a machine of the character disclosed a flat surface, a blade, and means for forcing the dough between said surface and blade and curling up the dough as it emerges from said blade.

4. In a machine of the character disclosed a surface, a blade having a straight edge and means for forcing the dough between said surface and the straight edge of said blade to curl up the dough as it emerges from said blade.

5. In a machine of the character disclosed, a movable surface upon which the dough is placed, a blade adjacent said surface and means for moving said surface to force the dough under the blade to curl up the dough as it emerges from said blade.

6. In a machine of the character disclosed, a surface upon which the dough is placed, a blade adjacent said surface, means for forcing the dough between said surface and said blade and curling up the dough as it emerges from said blade and means for adjusting said blade with relation to said surface.

7. In a machine of the character disclosed, a surface upon which the dough is placed, a blade located adjacent said surface, means for forcing the dough between said surface and said blade and curling up the dough as it emerges from said blade, and means for adjusting said blade in a parallel direction with relation to said surface.

8. In a machine of the character disclosed, a surface upon which the dough is placed, a blade located adjacent said surface and inclined with relation to said surface, and means for forcing the dough between said surface and said blade and curling up the dough as it emerges from said blade.

9. In a machine of the character disclosed, a surface upon which the dough is placed, a blade located adjacent said surface and inclined with relation to said surface, means for forcing the dough between said surface and said blade and curling up the dough as it emerges from said blade and means for adjusting the inclination of said blade.

10. In a machine of the character disclosed, a belt conveyer upon which the dough is placed, a blade under which the dough is carried by said conveyer and curled up as it emerges from said blade, said blade being adapted to be placed either directly over one of the rollers of the conveyer belt or between said rollers.

11. In a machine of the character disclosed, pressure surfaces, a blade, and means for forcing the dough between said pressure surfaces and between one of said surfaces and the edge of said blade and for curling up the dough as it emerges from said blade.

12. In a machine of the character disclosed, pressure surfaces, a blade, means for forcing the dough between said pressure surfaces and between one of said surfaces and the edge of said blade to curl up the dough as it emerges from said blade and means for varying the position of said surfaces with relation to each other.

13. In a machine of the character disclosed, a surface, a blade, means for flouring said surface, and means for forcing the dough between said surface and said blade to curl up the dough as it emerges from said blade.

14. In a machine of the character disclosed, a surface, a blade, means for automatically flouring said surface and means for forcing the dough between said surface and said blade and curling up the dough as its emerges from said blade.

15. In a machine of the character disclosed, a surface, a blade, means for applying flour to said surface, and means for removing the excess flour from said surface, and means for forcing the dough between said surface and blade and curling up the dough as it emerges from said blade.

16. In a machine of the character disclosed, a surface, a blade, means for applying flour to said surface and means for automatically removing the excess flour from said surface and means for forcing the dough between said surface and blade and curling up the dough as it emerges from said blade.

17. In a machine of the character disclosed, a flexible surface, a blade, and means for conveying the dough between said surface and said blade and curling up the dough as it emerges from said blade.

18. In a machine of the character disclosed, a flexible surface, a blade, means for conveying the dough between said surface and said blade and curling up the dough as it emerges from said blade, and means for adjusting the flexibility of said surface.

19. In a machine of the character disclosed, a blade, a belt conveyer for conveying the dough between it and said blade and curling up the dough as it emerges from said blade and means for adjusting the tension of the conveyer belt.

20. In a machine of the character disclosed, a surface, a blade, means for forcing the dough between said surface and said blade and curling up the dough as it emerges from said blade, and means at the sides of said surface and said blade for engaging the dough and determining the length of the roll formed from the dough.

21. In a machine of the character disclosed, a surface, a blade, walls for engaging said blade to hold it in position and means for forcing the dough between said surface and said blade to curl up the dough as it emerges from said blade.

22. In a machine of the character disclosed, a surface, an adjustable blade, means for forcing the dough between said surface and blade, walls, and means for drawing said walls against the side edges of said blade to hold the blade rigidly in adjusted position.

23. In a machine of the character disclosed, a surface, an adjustable blade, means for forcing the dough between said surface and blade, walls at the side edges of the blade, bolts extending through said walls, and nuts on said bolts for engaging said walls to draw the walls against the side edges of said blade to hold the blade rigidly in position.

24. A machine for shaping dough into loaves, an endless traveling belt passing around two pulleys, a device for flouring the belt, a device for removing the surplus flour, the shaping tool 10, the side-walls 7, the bolts 11, nuts 13, and means for imparting motion to the belt.

25. In a machine of the character disclosed, a surface upon which the dough is placed, a blade located adjacent said surface, means for forcing the dough between said surface and said blade and curling up the dough as it emerges from said blade and means for adjusting said blade perpendicularly to said surface.

26. In a machine of the character disclosed, a surface upon which the dough is placed, a blade located adjacent said surface, means for forcing the dough between said surface and said blade and curling up the dough as it emerges from said blade, and means for adjusting said blade perpendicularly and in a parallel direction to said surface.

27. In a machine of the character disclosed, a movable surface, a rigid blade associated with said surface, said surface adapted to carry dough under said blade so that the dough will curl up as it emerges from said blade.

28. In a machine of the character disclosed, a surface, a blade having its edge associated with said surface, a kneading surface associated with said first surface and leading to said edge, means for forcing dough between said first surface and said kneading surface to knead the dough and for forcing the dough between said first surface and said blade edge to curl up the kneaded dough as it emerges from said blade edge.

29. In a machine of the character disclosed, a movable surface, a rigid blade having its edge associated with said surface, a rigid kneading surface associated with said movable surface and leading to said blade edge, said movable surface adapted to convey the dough against said kneading surface to knead the dough and past said blade edge to curl up the kneaded dough as it emerges from said blade edge.

30. In a machine of the character disclosed, a surface, a blade having its edge associated with said surface, means for forcing dough between said surface and said blade, said blade being adapted to scrape the dough and give it an adhesive surface as the dough emerges from said edge.

31. In a machine of the character disclosed, a surface, a blade having its edge associated with said surface, means for forcing dough between said surface and said blade, said blade being adapted to scrape the dough and give it an adhesive surface and to roll up the dough with said adhesive surface inside the roll.

In testimony whereof, I have hereunto set my hand at San Francisco, California, this 2nd day of December 1914.

JOHN LOUIS BURGOYNE.

In presence of—
ALAN FRANKLIN,
P. S. PIDWELL.

Copies of this patent may be obtained for five cents each, by addressing the "Commissioner of Patents, Washington, D. C."